United States Patent
Takada

(10) Patent No.: US 11,754,985 B2
(45) Date of Patent: Sep. 12, 2023

(54) INFORMATION PROCESSING APPARATUS, INFORMATION PROCESSING METHOD AND COMPUTER PROGRAM PRODUCT

(71) Applicant: KABUSHIKI KAISHA TOSHIBA, Tokyo (JP)

(72) Inventor: Masaaki Takada, Abiko (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 255 days.

(21) Appl. No.: 17/185,577

(22) Filed: Feb. 25, 2021

(65) Prior Publication Data

US 2021/0325837 A1 Oct. 21, 2021

(30) Foreign Application Priority Data

Apr. 20, 2020 (JP) ................................. 2020-074558

(51) Int. Cl.
*G05B 13/04* (2006.01)
*G06N 20/00* (2019.01)
*G05B 13/02* (2006.01)

(52) U.S. Cl.
CPC ....... *G05B 13/042* (2013.01); *G05B 13/0265* (2013.01); *G05B 13/048* (2013.01); *G06N 20/00* (2019.01)

(58) Field of Classification Search
CPC .......................... G05B 13/042; G05B 13/0265; G05B 13/048; G05B 17/02; G06N 20/00; G06N 3/08
USPC .................................................... 700/28-37
See application file for complete search history.

(56) References Cited

U.S. PATENT DOCUMENTS

| | | | |
|---|---|---|---|
| 6,789,062 B1 | 9/2004 | Phillips et al. | |
| 9,536,177 B2* | 1/2017 | Chalasani | G06V 10/82 |
| 10,504,040 B2* | 12/2019 | Zhang | G16B 40/20 |
| 2017/0132528 A1* | 5/2017 | Aslan | G06N 20/00 |
| 2017/0364826 A1 | 12/2017 | Mitarai | |
| 2018/0046902 A1* | 2/2018 | Liao | G06N 3/045 |
| 2018/0121815 A1 | 5/2018 | Lamparter et al. | |
| 2019/0311298 A1* | 10/2019 | Kopp | G06V 30/19167 |
| 2019/0378044 A1* | 12/2019 | Jeffery | G06N 20/00 |

(Continued)

FOREIGN PATENT DOCUMENTS

JP  2000-55703 A   2/2000
JP  5060006 B2    10/2012

(Continued)

OTHER PUBLICATIONS

Mnih, Volodymyr, et al. "Playing atari with deep reinforcement learning." arXiv preprint arXiv:1312.5602 (2013).pp.1-9 (Year: 2013).*

(Continued)

*Primary Examiner* — Satish Rampuria
(74) *Attorney, Agent, or Firm* — Oblon, McClelland, Maier & Neustadt, L.L.P.

(57) ABSTRACT

An information processing apparatus of an embodiment includes one or more hardware processors. The one or more hardware processors receive input of parameter of a model to be estimated by machine learning and input of first input data. The one or more hardware processors train, by using the first input data as training data, the model using a cost function for which a cost is smaller as a change in the parameter is smaller.

13 Claims, 5 Drawing Sheets

(56) References Cited

U.S. PATENT DOCUMENTS

| | | | |
|---|---|---|---|
| 2020/0014761 A1 | 1/2020 | Kawaai et al. | |
| 2020/0210889 A1 | 7/2020 | Tsuji et al. | |
| 2020/0302337 A1* | 9/2020 | Jeffery | G06N 20/00 |
| 2021/0049298 A1* | 2/2021 | Suresh | G06F 21/6245 |

FOREIGN PATENT DOCUMENTS

| | | |
|---|---|---|
| JP | 2015-38709 A | 2/2015 |
| JP | 2017-224156 A | 12/2017 |
| JP | 2019-101485 A | 6/2019 |
| JP | 6544594 B2 | 7/2019 |
| JP | 6650468 B2 | 2/2020 |
| WO | WO2018/173121 A1 | 9/2018 |

OTHER PUBLICATIONS

Tsochantaridis, Ioannis, et al. "Support vector machine learning for interdependent and structured output spaces." Proceedings of the twenty-first international conference on Machine learning. 2004.pp. 1-8 (Year: 2004).*

Zhang, Wei, and Thomas G. Dietterich. "A reinforcement learning approach to job-shop scheduling." IJCAI. vol. 95. 1995.pp.1-7 (Year: 1995).*

Vecerik, Mel, et al. "Leveraging demonstrations for deep reinforcement learning on robotics problems with sparse rewards." arXiv preprint arXiv:1707.08817 (2017).pp. 1-10 (Year: 2017).*

He, Xiangnan, and Tat-Seng Chua. "Neural factorization machines for sparse predictive analytics." Proceedings of the 40th International ACM SIGIR conference on Research and Development in Information Retrieval. 2017.pp. 355-364 (Year: 2017).*

Zheng, Miao, et al. "Graph regularized sparse coding for image representation." IEEE transactions on image processing 20.5 (2010):pp. 1327-1336. (Year: 2010).*

Ilja Kuzborskij, et al., "Stability and Hypothesis Transfer Learning", International Conference on Machine Learning, 2013, pp. 942-950.

Ilja Kuzborskij, et al., "Fast rates by transferring from auxiliary hypotheses". Machine Learning, 106(2), , 2017, pp. 171-195.

* cited by examiner

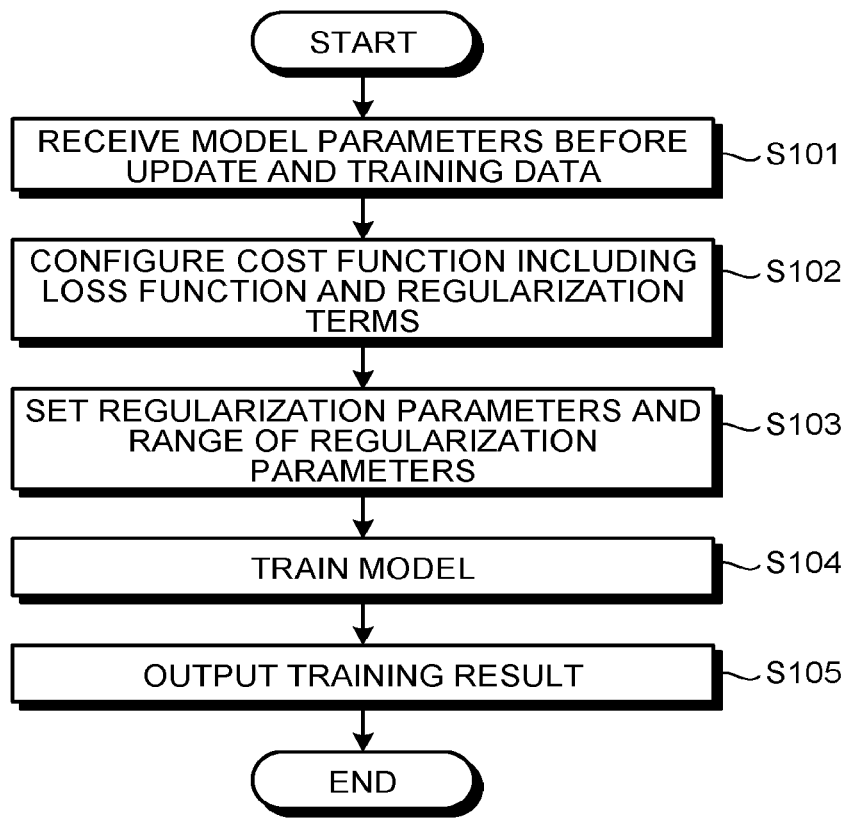

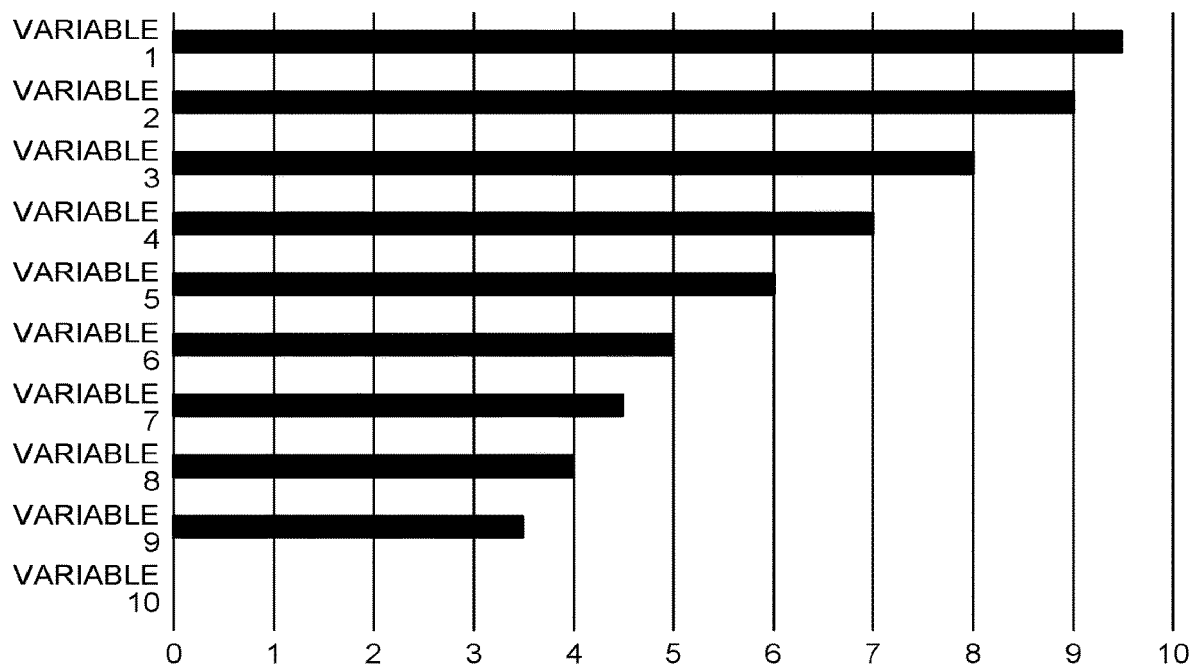

INFORMATION PROCESSING APPARATUS, INFORMATION PROCESSING METHOD AND COMPUTER PROGRAM PRODUCT

CROSS-REFERENCE TO RELATED APPLICATIONS

This application is based upon and claims the benefit of priority from Japanese Patent Application No. 2020-074558, filed on Apr. 20, 2020; the entire contents of which are incorporated herein by reference.

FIELD

Embodiments described herein relate to an information processing apparatus, an information processing method and a computer program product.

BACKGROUND

Techniques for analyzing the fluctuation factors of quality characteristics and predicting electricity demand have been proposed using models estimated by statistics and machine learning (regression models, classification models, etc.). Although such techniques assume that the environment is in the stationary state, many real environments are not in the stationary state.

To deal with data being non-stationary, techniques for updating models have been proposed. There are two types of techniques to update a model: an active approach; and a passive approach. The active approach is a method of automatically detecting "when to update" and performing update of the model at the detected timing. The passive approach is a method of continuously updating the model each time without explicitly detecting "when to update". Conventional techniques are described in prior art.

However, in the prior art, there have been cases where both robustness (stability) and followability (accuracy) at the time of model update could not be achieved.

BRIEF DESCRIPTION OF THE DRAWINGS

FIG. 2 is a flowchart illustrating a training process according to the present embodiment;

FIG. 3 is a diagram illustrating an example of an output method of a training result;

FIG. 4 is a diagram illustrating an example of the output method of the training result;

FIG. 5 is a diagram illustrating an example of the output method of the training result;

DETAILED DESCRIPTION

Figure 1:
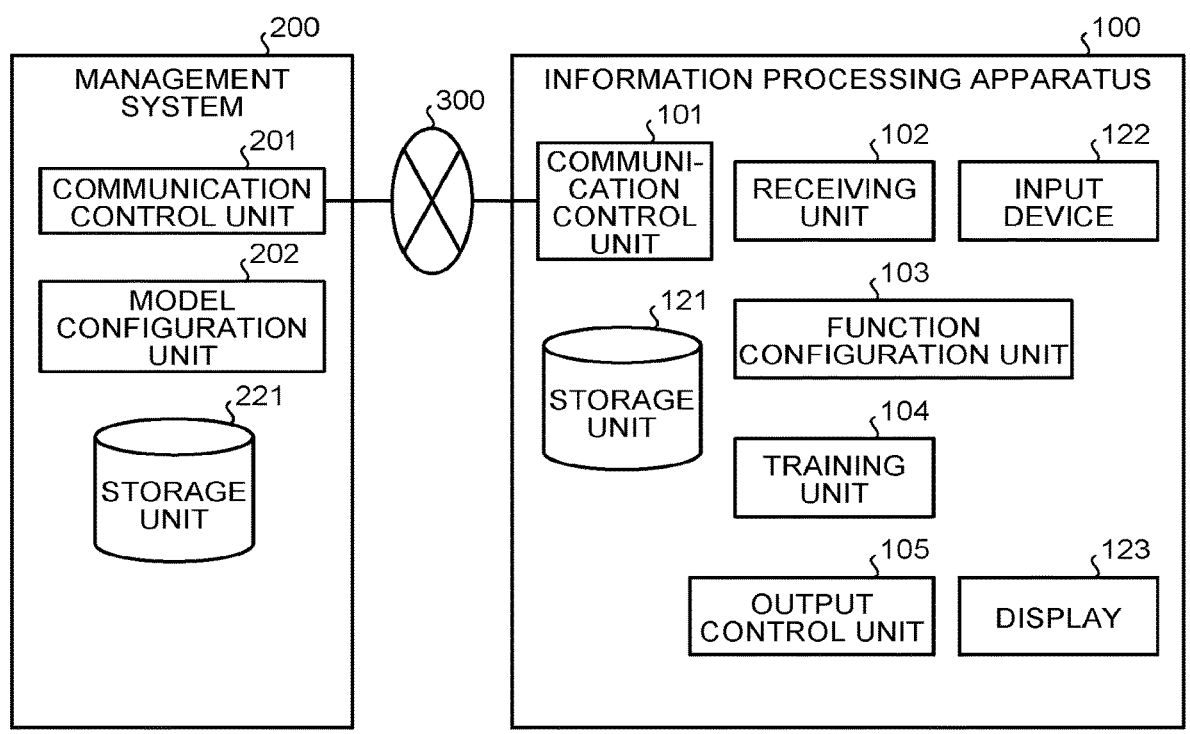
FIG. 1 is a block diagram of an information processing system including an information processing apparatus of the present embodiment.

An information processing apparatus of an embodiment includes one or more hardware processors. The one or more hardware processors receive input of parameter of a model to be estimated by machine learning and input of first input data. The one or more hardware processors train, by using the first input data as training data, the model using a cost function for which a cost is smaller as a change in the parameter is smaller.

With reference to the accompanying drawings, a preferable embodiment of an information processing apparatus according to the present invention will be described in detail below.

As mentioned above, non-stationary change may occur in data used to input a model. The non-stationary change of the data is also called concept drift. Various kinds of non-stationary states are known, such as abrupt and gradual changes. Due to such non-stationary states, the trend of the data changes with the passage of time, so that the estimation accuracy and prediction accuracy (model accuracy) of the model deteriorate.

In order to deal with the data being non-stationary, the model needs to be updated. When updating the model, "when to update" and "how to update" need to be determined. As described above, the updating techniques are roughly categorized on the basis of "when to update" into two approaches: an active approach; and a passive approach.

The active approach has the advantage of being easy to follow the abrupt change, whereas it has the disadvantage of being difficult to follow the gradual change. In addition, in the case where detection of update timing fails (missed detection or false detection), model accuracy deteriorates significantly.

The passive approach can be used to follow the gradual change, and furthermore, the model accuracy is less likely to significantly deteriorate. On the other hand, since the model is updated each time even in a stationary state where the data trend does not change, the passive approach may increase the burden of model maintenance. In particular, the model fluctuates unstably and significantly each time when the correlation between the feature values input to the model is high, the number of kinds of the feature values input to the model is very large, and the model contains a lot of noise. In other words, the model update is no longer robust.

In addition, frequent model update requires maintenance operations such as pre-checking and post-evaluation, so that the more frequently the model is updated, the greater the burden of maintenance operations. Conversely, trying to stabilize the model update may lead to problems with the model not following the abrupt change.

Therefore, in the following embodiment, a method is implemented that achieves both robustness (stability) and followability (accuracy) at the time of model update. The present embodiment is a method that adopts the passive approach to follow the gradual change, follows a significant change that occurs in the data trend, and does not update the model when no change occurs in the data trend. Devising "how to update" allows "when to update" to be automatically detected to perform update.

The information processing apparatus of the present embodiment can be applied, for example, to the training and the analysis of models for use in systems that perform quality control in factories and plants. Applicable systems are not limited to the aforementioned systems. Semiconductor factories and chemical plants importantly need to reduce variability of quality characteristics and fluctuation of the quality characteristics, which leads to the reduction of defects and improve yields. Models estimated by machine learning, such as a regression model and a classification model, are used to elucidate the factors of the fluctuation and the variability of the quality characteristics.

FIG. 1 is a block diagram illustrating an example of a configuration of an information processing system including an information processing apparatus of the present embodiment. As illustrated in FIG. 1, the information processing system has a configuration in which an information processing apparatus 100 and a management system 200 are connected via a network 300.

Each of the information processing apparatus 100 and the management system 200 can be configured as, for example, a server apparatus. The information processing apparatus 100 and the management system 200 may be implemented as a plurality of physically independent apparatuses (systems), or each function may be physically configured within one apparatus. In the latter case, the network 300 may not be included. At least one of the information processing apparatus 100 and the management system 200 may be built on a cloud environment.

The network 300 is, for example, a network such as a local area network (LAN) and the Internet. The network 300 may be either a wired network or a wireless network. The information processing apparatus 100 and the management system 200 may transmit and receive data using a direct wired or wireless connection between components without the network 300.

The management system 200 is a system that manages a model to be processed by the information processing apparatus 100, data used to train (update) and analyze the model, etc. The management system 200 includes a storage unit 221, a communication control unit 201, and a model configuration unit 202.

The storage unit 221 stores various pieces of information used in various processes executed by the management system 200. For example, the storage unit 221 stores parameters of the model and training data used to train the model. The storage unit 221 can be composed of any commonly available storage medium such as a flash memory, a memory card, a Random Access Memory (RAM), a Hard Disk Drive (HDD), and an optical disk.

The model outputs an inference result for an objective variable by inputting an explanatory variable. The model includes, for example, a linear regression model, a generalized linear model, a generalized additive model, a neural network. The model is not limited to the aforementioned models, and may be any model that is represented by using the parameters.

The model is estimated by training with the training data including the objective and explanatory variables. The objective variable includes, for example, quality characteristics, failure rates, information indicating either good or defective products. The explanatory variable includes other sensor value, a processing condition, a control value, etc.

The storage unit 221 may store parameters of a plurality of models. For example, the storage unit 221 may store the parameters of the models that have been updated in the past. In this case, the storage unit 221 may store each model in correspondence with the date/time of the update and identifying information such as the version.

The communication control unit 201 controls communication with an external apparatus such as the information processing apparatus 100. For example, the communication control unit 201 transmits information about the model (e.g., parameters) and the training data to the information processing apparatus 100.

In the case where the parameters of the models are stored in the storage unit 221, the communication control unit 201 may receive a request for the parameters of the model specified by a user or others from the information processing apparatus 100 and may transmit the parameters of the model corresponding to the request to the information processing apparatus 100.

The model configuration unit 202 configures a model that can be used as the model before the update. For example, the model configuration unit 202 uses the training data to configure the model by training. The model configuration unit 202 may configure the model by defining parameters based on knowledge about a domain (domain knowledge). For example, in the case where the use of the model based on the domain knowledge is specified by the user or others, the communication control unit 201 may receive a request for the parameter of the model based on the domain knowledge from the information processing apparatus 100 and may transmit the parameters of the model corresponding to the request to the information processing apparatus 100. The model configuration unit 202 may also request the user to input the domain knowledge and may configure the model according to the domain knowledge. Furthermore, the model configuration unit 202 may configure the model by modifying the model according to the domain knowledge input by the user after configuring the model by training using the training data.

In the case where the model is prepared in advance (e.g., stored in the storage unit 221) and the case where a model based on the domain knowledge is not used, the management system 200 may not include the model configuration unit 202. Furthermore, the model configuration unit 202 may be configured to be included in the information processing apparatus 100.

Each of the aforementioned units (communication control unit 201, model configuration unit 202) is implemented by one or more processors. For example, each of the aforementioned units may be implemented by causing a processor such as a Central Processing Unit (CPU) to execute a computer program, i.e., software. Each of the aforementioned units may be implemented by a processor such as a dedicated Integrated Circuit (IC), i.e., hardware. Each of the aforementioned units may be implemented by a combination of software and hardware. In the case where a plurality of processors are used, each processor may implement one of the units, or two or more of the units.

The information processing apparatus 100 includes a storage unit 121, an input device 122, a display 123, a communication control unit 101, a receiving unit 102, a function configuration unit 103, a training unit 104, and an output control unit 105.

The storage unit 121 stores various pieces of information used in various processes executed by the information processing apparatus 100. For example, the storage unit 121 stores information (e.g., training data and the parameters of the model) obtained from the management system 200 via the communication control unit 101 and the receiving unit 102, and further stores the parameters of the model after being trained by the training unit 104. The storage unit 121 can be composed of any commonly available storage medium such as a flash memory, a memory card, a RAM, an HDD, and an optical disk.

The input device 122 is a device that allows the user or others to input information. The input device 122 is, for example, a keyboard and a mouse. The display 123 is an example of an output device that outputs information, e.g., a liquid crystal display. The input device 122 and the display 123 may be integrated, e.g., as a touch screen.

The communication control unit 101 controls communication with an external apparatus such as the management system 200. For example, the communication control unit 101 receives information about the model (e.g., parameters), training data, etc. from the management system 200. The communication control unit 101 also transmits a request for the model to be used as the model before the update, the model after the update, etc., to the management system 200.

The receiving unit 102 receives input of various pieces of information. For example, the receiving unit 102 receives the parameters of the model and the training data (first input data), both of which are received from the management system 200 via the communication control unit 201 and the communication control unit 101. The parameters of the model that is received from the management system 200 are, for example, parameters of the model that has been trained by the training data (second input data) that is different from the first input data. The training data different from the first input data (second input data) is, for example, the training data including the explanatory and objective variables obtained at a time prior to the first input data.

The function configuration unit 103 configures a cost function that the training unit 104 uses for the purpose of training the model. The function configuration unit 103 configures the cost function for which a cost is smaller as a change in each of the parameters is smaller. Details of the process of the function configuration unit 103 are described below. A cost represents the difference between the output of the model and the correct answer.

The training unit 104 trains the model using the training data received by the receiving unit 102. In the case where the management system 200 stores a plurality of models, the training unit 104 may train a specified model among the models. Details of the training process by the training unit 104 are described below.

The output control unit 105 controls the output of the various pieces of information processed by the information processing apparatus 100. For example, the output control unit 105 outputs (displays), on the display, at least one of the parameters of the model after being updated through the training process by the training unit 104 and the differences between the parameters of the model before the update and the parameters after the update. An output format of the information by the output control unit 105 may be any format, and for example, the output control unit 105 can output the information in at least one of a table format (list format) and a graph format.

The output control unit 105 may output information to an apparatus external to the information processing apparatus 100. For example, the output control unit 105 may transmit information for displaying the differences between the parameters before the update and the parameters after the update to an external apparatus including a display apparatus.

The output control unit 105 outputs the differences between the parameters before update and the parameters after update, etc., which allows for analyzing, for example, fluctuation factors of the objective variable (such as quality characteristics). The output control unit 105 may be configured to output the parameters after the update to an inference system that uses the model to execute inference (e.g., predicting electricity demand). This allows the inference system to execute inference with greater accuracy using an updated model that follows changing data.

Each of the aforementioned units (the communication control unit 101, receiving unit 102, function configuration unit 103, training unit 104, output control unit 105) is implemented by one or more processors. For example, each of the aforementioned units may be implemented by having a processor such as a CPU execute a computer program, i.e., software. Each of the aforementioned units may be implemented by a processor such as a dedicated IC, i.e., hardware. Each of the aforementioned units may be implemented by a combination of software and hardware. When a plurality of processors are used, each processor may implement one of the units, or two or more of the units.

Furthermore, the details of a configuring method of the cost function by the function configuration unit 103 and the training process by the training unit 104 will be described. In the following, although a case where the linear regression model is used as a model will be described as an example, the same method can be applied to other models as well. Furthermore, an example will be described below in which the explanatory variable is sensor value data and the objective variable is quality characteristic data.

It is assumed that there is quality characteristic data (an example of the objective variable) $y_i$ for products $i=1, \ldots, n$ (where n is an integer of 1 or more) and the sensor value data (an example of the explanatory variable) $x_{ij}$ for other sensors $j=1, \ldots, p$ (where p is an integer of 1 or more). n corresponds to the number of the products and p corresponds to the number of the sensors. In this case, the linear regression model represented by the equation (1) below is considered.

$$y_i = \beta_0 + \beta_1 x_{i1} + \ldots + \beta_p x_{ip} \tag{1}$$

The parameters $\beta_0, \beta_1, \ldots,$ and $\beta_p$ are called the regression coefficients of the linear regression model. The value of each parameter multiplied by the standard deviation of each sensor, respectively, is called the influence level. The influence level represents how much each sensor affects the quality characteristics on average.

For the explanatory variable, the sensor value may be used as it is, or a value obtained by adding some conversion to the sensor value may be used. The conversion includes, for example, a power (square, cube, etc.), standardization (normalization), and an operation using a plurality of sensor values (multiplication of a plurality of sensor values, etc.).

When the number of the sensors p (the number of feature values) is very large, a technique called sparse modeling is often used. The sparse modeling is a technique for training a model from a large number of feature values assuming a small number of feature values are active (active feature values are sparse). In the sparse modeling, the model is trained so that parameters have sparsity. Having the sparsity means that the values of most parameters are zero. By using the parameters trained to have the sparsity, even when the number of the sensors is large, only the sensor values of the sensors corresponding to parameters with non-zero values are used for model-based inference. In the sparse modeling, sparse regularization terms, which are the regularization terms that induce the sparsity of the parameters, may be used. In Least absolute shrinkage and selection operator (Lasso), which is a typical sparse modeling method, the parameters $\beta_0, \beta_1, \ldots, \beta_p$ are estimated by solving the optimization problem represented by the following equation (2).

$$\hat{\beta} = \operatorname{argmin}_\beta \left\{ \sum_{i=1}^{n} (y_i - \beta_0 - \beta_1 x_{i1} - \ldots - \beta_p x_{ip})^2 + \lambda \sum_{j=1}^{p} |\beta_j| \right\} \tag{2}$$

$\lambda > 0$ is called a regularization parameter, which is determined by cross-validation, etc.

The advantage of the sparse modeling is that the regression coefficient $\beta_1$ tends to be estimated to be zero, so that a model using only a small number of the explanatory variables (sensor value data) is estimated. This facilitates the interpretability of the model, and further allows for highly accurate model estimation even when the number of the sensors increases.

If such a model can explain the behavior of the quality characteristics in terms of various sensor values, it can be used to: understand the influence of each sensor on the quality characteristics; identify the fluctuation factors; control the quality by feed-forward or feed-back control; and predict future quality characteristics.

In order to make the model follow the data trend, for example, periodically (e.g., daily) updating the data and remaking the model are performed.

When assuming $y'_i$ to be the quality characteristic data (objective variable) and $x'_{ij}$ to be the sensor value data (explanatory variable) of the products i=1, . . . , n' (where n' is an integer of 1 or more) to be used for model update, as in equation (2), the parameters $\beta'_0, \beta'_1, \ldots, \beta'_p$ can be estimated as in the equation (3) below.

$$\hat{\beta}' = \operatorname{argmin}_{\beta} \left\{ \sum_{i=1}^{n'} (y'_i - \beta_0 - \beta_1 x'_{i1} - \ldots - \beta_p x'_{ip})^2 + \lambda' \sum_{j=1}^{p} |\beta_j| \right\} \quad (3)$$

However, as mentioned above, such an estimation method (parameter update method) may cause model (parameters) fluctuation even when the data trend does not change. This may increase the burden of maintenance and operation work, such as pre-checking and post-checking. Therefore, in the present embodiment, the function configuration unit 103 configures the cost function represented by the following equation (4). The training unit 104 then updates (trains) the model by estimating the parameters using the cost function represented by the following equation (4).

$$\hat{\beta}' = \operatorname{argmin}_{\beta} \quad (4)$$
$$\left\{ \sum_{i=1}^{n} (y'_i - \beta_0 - \beta_1 x'_{i1} - \ldots - \beta_p x'_{ip})^2 + \lambda_1 \sum_{j=1}^{p} |\beta_j| + \lambda_2 \sum_{j=1}^{p} |\beta_j - \hat{\beta}_j| \right\}$$

Here, $\lambda_1>0$ and $\lambda_2>0$ are the regularization parameters, and $\beta_j$ with a hat symbol "^" is the regression coefficient of the model before the update (e.g., the regression coefficient of the previously estimated model). The first Σ term is called the loss function. The second and third Σ terms are called the sparse regularization terms. The function configuration unit 103 may configure the cost function so that the second term is not included when $\lambda_1=0$.

As represented in the equation (4), the cost function includes the loss function and the regularization terms using the differences between the parameters before update and the parameters after the update. That is, in the present embodiment, the regression coefficients after the update (β' with hat symbol "^") is estimated so that the differences between the regression coefficients before the update with hat symbol "^") and the regression coefficients after the update are as small as possible. This results in the same model as before the update when the data trend remains the same. In the case where the data trend is changed for some sensors, the model is changed only for a part of the data. Furthermore, the data trend is changed across the sensors, the entire model changes.

In other words, this maintains robustness and followability, and facilitates the model maintenance by reducing the number of model updates. The inclusion of the regularization terms with the difference allows the model to avoid being significantly influenced by noise.

The equation (4) uses a squared error (squared loss) as the loss function but the loss function is not limited thereto. For example, the loss function may be any of absolute loss, quantile loss, Huber loss, epsilon sensitivity loss, logistic loss, exponential loss, Hinge loss, and smoothed Hinge loss, or a combination thereof.

Furthermore, the equation (4) uses a formulation in which L1 norms of difference are used as sparse regularization terms, but the sparse regularization terms are not limited thereto. Any regularization term that induces sparsity may be used as a sparse regularization term. A sparse regularization term, which is formulated using a difference but not an absolute value, may be used. The sparse regularization terms may be formulated by at least one of Smoothly Clipped Absolute Derivation (SCAD), Minimax Concave Penalty (MCP), an Lq norm (0≤q<1), Elastic Net, an L1/2 norm, and a square of an L1 norm.

In the equation (4), although the regression coefficient of the model before the update (β with hat symbol "^") is used as is, the regression coefficient modified by the domain knowledge (β with hat symbol "^") may also be used. For example, changes can be applied, such as setting the regression coefficient for a particular sensor to zero or other arbitrary number. By including the domain knowledge in the formulation, the model can be modeled in line with the domain knowledge, which allows for obtaining a convincing model easier.

Instead of the previously updated model, the model configured by the model configuration unit 202 of the management system 200 may be used. For example, the receiving unit 102 receives input of the model defined by the model configuration unit 202 based on the knowledge about the domain. The function configuration unit 103 configures the function so that the parameters of the received model are used as the parameters before the update.

Although the equation (4) includes the regularization terms using the differences between before and after the update for all parameters, regularization terms using a difference for some of the parameters may be used. Although the equation (4) represents the case where there is one model before the update, there may be a plurality of models before the update, and in addition the sparse regularization terms may be configured for each of the models and added to the cost function.

The training unit 104 updates the parameters of the model so as to optimize the cost function configured by the function configuration unit 103. The training method (optimization method) by the training unit 104 may be any method. For example, the training unit 104 can use continuous optimization, such as coordinate descent, gradient descent, proximity gradient, and alternating direction multiplier methods. The continuous optimization is optimization for a continuous variable that has a continuous value. This allows the training unit 104 to train the model sparsely by continuously optimizing a change with respect to the model (train the model so that the parameters have sparsity).

The training unit 104 may execute the training process in accordance with information specified by the user or others using the input device 122. For example, the receiving unit 102 may be configured to receive information specified by the user or others using the input device 122, such as:
- a loss function to be used;
- regularization terms to be used;
- regularization parameters to be tuned;
- a range of the regularization parameters; and
- of a plurality of models, a model used as the model before update.

The training unit 104 executes the training using the specified value when at least some of the loss function, the sparse regularization terms, the regularization parameters, and the range of the regularization parameters are specified.

A regularization parameter to be tuned is a regularization parameter for which a value is to be determined (tuned) by using the cross-validation or other methods during training. For example, the regularization parameter with a fixed value (such as the default value) can be configured not to be specified as the regularization parameter to be tuned.

The range of the regularization parameters is an allowable range of possible values of the regularization parameters specified as the regularization parameters to be tuned. The training unit 104 determines the optimal values of the regularization parameter within this range.

Next, the training process with the information processing apparatus 100 according to the present embodiment configured in such a manner will be described. FIG. 2 is a flowchart illustrating an example of the training process in the present embodiment.

The receiving unit 102 receives the parameters of the model before the update and the training data transmitted from the management system 200 via the communication control unit 101 (step S101). The function configuration unit 103 configures the cost function, including the loss function and the regularization terms, as in e.g., the equation (4) (step S102).

The training unit 104 may set the regularization parameters and the range of the regularization parameters specified by the user or others via the input device 122 (step S103). In this case, the training unit 104 executes the training process to determine the regularization parameters within the set range. That is, the training unit 104 trains the model in accordance with the cost function configured by the function configuration unit 103 and within the set range when the range of the regularization parameters has been set (step S104).

The output control unit 105 outputs the training result of the model (step S105) and then ends the training process.

FIGS. 3 to 8 illustrate examples of how to output the training results. FIG. 3 is an example of a screen that outputs the updated parameters in the table format. As illustrated in FIG. 3, the output control unit 105 outputs a list (table) containing the explanatory variables ("variable" in the figure), the regression coefficients, and the influence levels corresponding to the sensors selected by the modeling.

The output items are not limited to the examples illustrated in FIG. 3. For example, descriptions of each sensor and p-values, etc. may be further included in the list. In the example in FIG. 3, the variables 1 to 9 are selected from among the many variables (sensors) as a result of the modeling.

FIG. 4 is an example of a screen that outputs the influence levels in the graph format. FIGS. 3 and 4 are examples of visualizing the updated parameters as a result of training. The output control unit 105 may output the differences (changes) between the parameters before the update and the parameters after the update.

Figure 6:
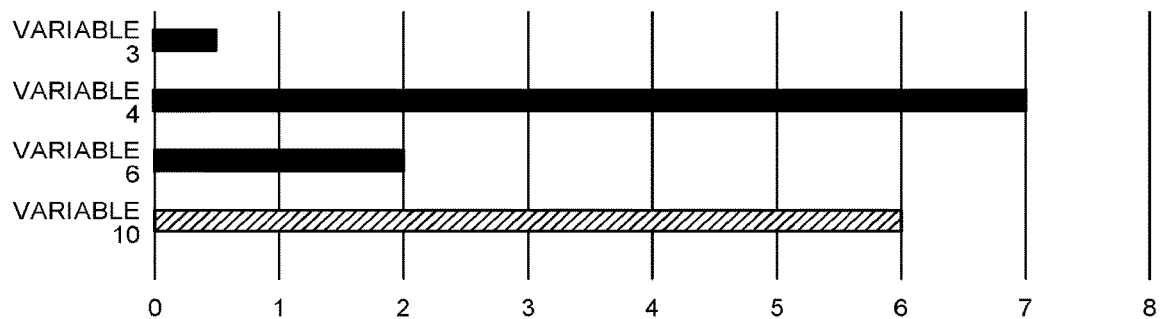
FIG. 6 is a diagram illustrating an example of the output method of the training result.

FIG. 5 is an example of a screen that outputs the differences in the table format. As illustrated in FIG. 5, the output control unit 105 may output a list including the explanatory variables, the changes in the regression coefficients, and the changes in the influence levels. FIG. 6 is an example of a screen that outputs the differences in the influence levels in the graph format.

Figure 7:
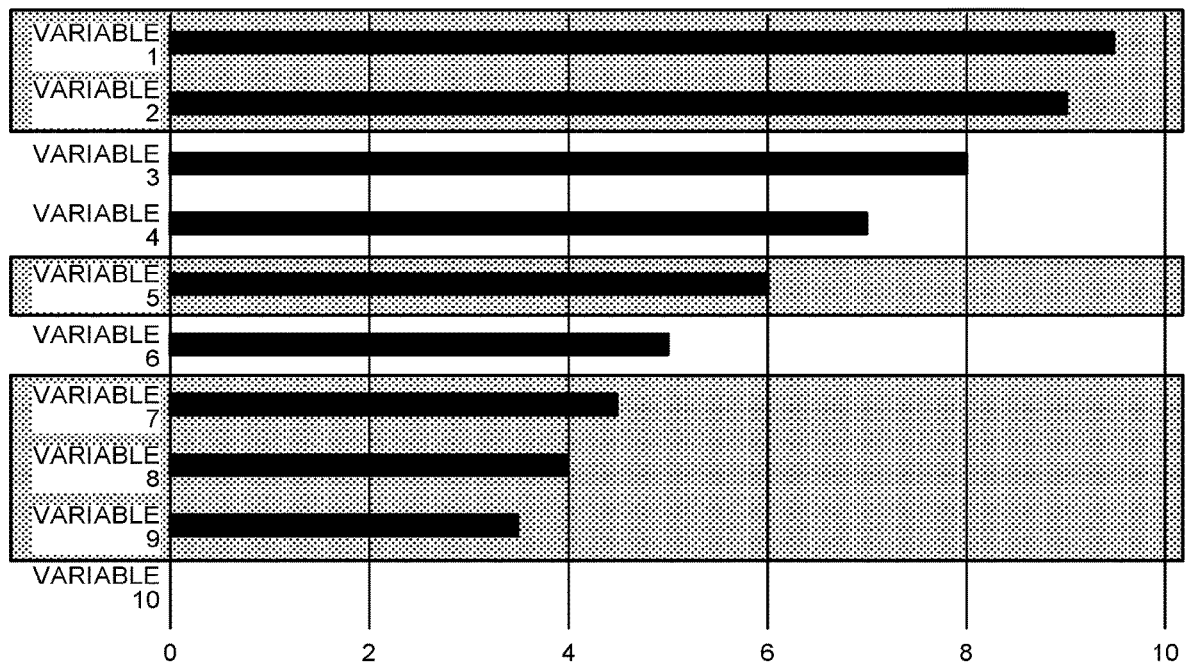
FIG. 7 is a diagram illustrating an example of the output method of the training result.

FIG. 7 is an example of a screen that displays the variables that have changed in different displaying modes. In FIG. 7, the shaded area illustrates the variables that have not changed. Displaying modes to be changed are not limited to the present displaying mode. For example, the shape and color of the graph may be different.

Figure 8:
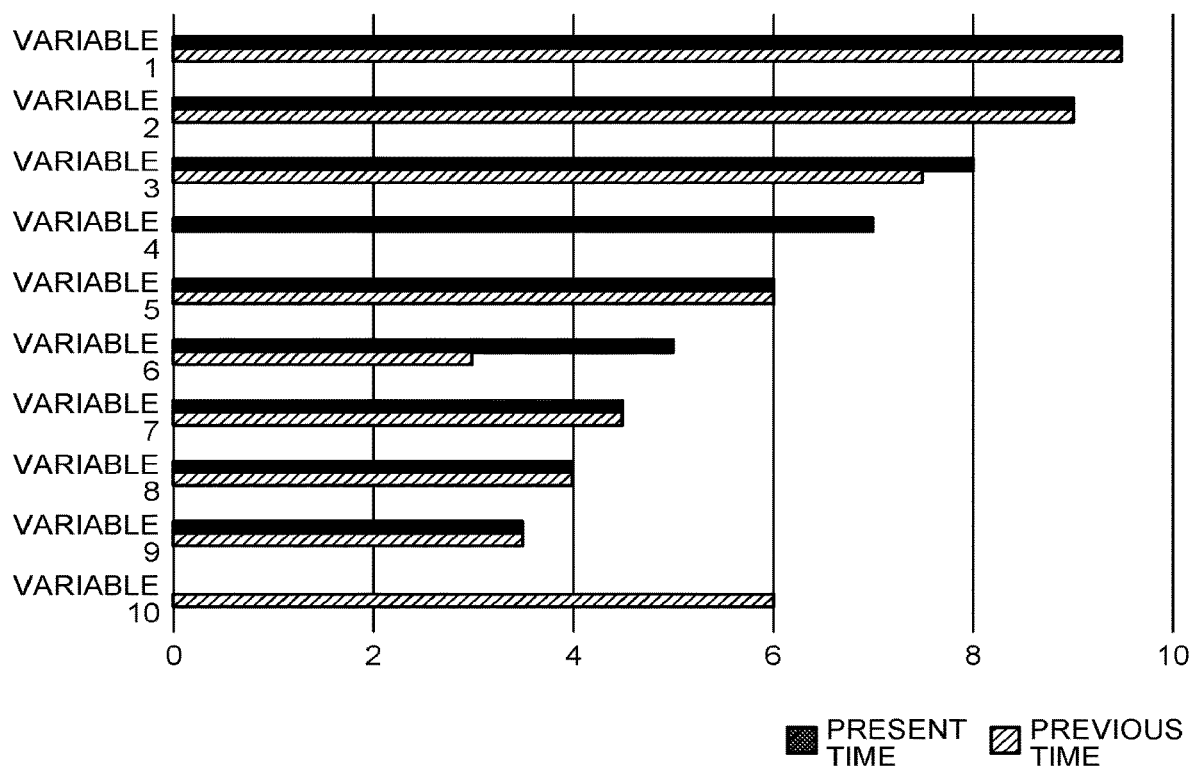
FIG. 8 is a diagram illustrating an example of the output method of the training result.

FIG. 8 is an example of a screen that comparably displays the parameters before the update and the parameters after the update.

By visualizing the parameters as illustrated in FIGS. 5 to 8, model maintenance operations only need to check the differences between before and after the updates. In other words, even when the number of the model parameters (explanatory variables) increases or the number of variables with changes increases, it becomes easier to check and validate the results and reduce the burden of the model maintenance operations.

Other Application Examples

So far, for example, the system that performs quality control in factories and plants has been describes. The present embodiment can also be applied, for example, to a system that predicts electricity demand. In this case, for example, the electricity demand is predicted with the daily electricity demand as the objective variable, together with the probability of precipitation and the amount of solar radiation, etc. as the explanatory variables. In such a system, the forecast accuracy will deteriorate when the model is not properly updated. By using the present embodiment, the model can be robustly updated keeping the model to follow the data adaptively.

As described above, the information processing apparatus according to the present embodiment enables both robustness (stability) and followability (accuracy) at the time of model update. In addition, the present embodiment reduces the burden of tasks such as checking and evaluation at the time of model update.

Figure 9:
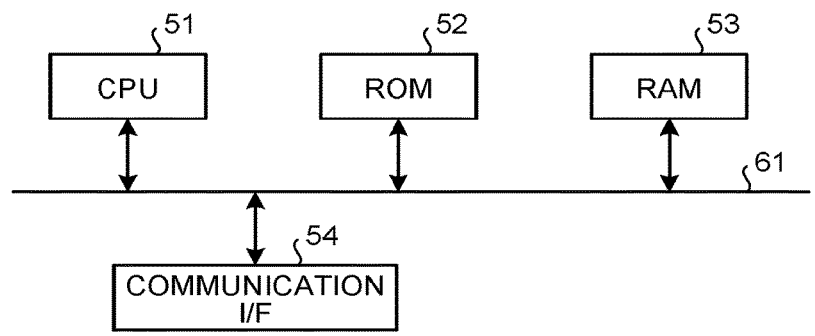
FIG. 9 is a hardware configuration diagram of the apparatus according to the present embodiment.

Furthermore, the hardware configuration of the apparatus (management system, information processing apparatus) according to the present embodiment will be described using FIG. 9. FIG. 9 is an illustration of an example hardware configuration of the apparatus according to the present embodiment.

The apparatus according to the present embodiment includes a control apparatus such as a CPU (Central Processing Unit) 51, a storage apparatus such as a ROM (Read Only Memory) 52 or a RAM (Random Access Memory) 53, a communication I/F 54 that connects to a network for communication, and a bus 61 that connects each unit.

A computer program executed by the apparatus according to the present embodiment is provided pre-installed in ROM 52, etc.

The computer program to be executed on the apparatus according to the present embodiment may be configured to be provided as a computer program product by recording it to a computer-readable recording medium such as a Compact Disk Read Only Memory (CD-ROM), a Flexible Disk (FD), a Compact Disk Recordable (CD-R), a Digital Versatile Disk (DVD).

Furthermore, the computer program executed by the apparatus according to the present embodiment may be configured to be provided by storing it on a computer connected to a network such as the Internet, and having it downloaded over the network. Also, the computer program executed by the apparatus according to the present embodiment may be configured to be provided or distributed via a network such as the Internet.

The computer program executed by the apparatus according to the present embodiment may cause the computer to function as each unit of the apparatus described above. The computer can be executed by the CPU 51 reading the computer program from a computer-readable storage medium onto a main storage apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
one or more hardware processors configured to:
receive input of a parameter of a model to be estimated by machine learning and input of first input data;
train; by using the first input data as training data, the model using a cost function for which a cost is smaller as a change in the parameter is smaller; and
control display of at least one of the parameter after the training and the change on a display, wherein
the cost function includes a loss function and a regularization term using the change, and
the regularization term is defined by at least one of an L1 norm Smoothly Clipped Absolute Derivation (SCAD), Minimax Concave Penalty (MCP), an Lq norm that is 0≤q<1, Elastic Net, an L1/2 norm, and a square of an L1 norm of the change.

2. The information processing apparatus according to claim 1, wherein the regularization term is defined by sparse regularization.

3. The information processing apparatus according to claim 1, wherein the loss function is defined by at least one of squared loss, absolute value loss, quantile loss, Huber loss, epsilon sensitivity loss, logistic loss, exponential loss, Hinge loss, and smoothed Hinge loss.

4. The information processing apparatus according to claim 1, wherein the one or more hardware processors:
receive a specification of the loss function, the regularization term, regularization parameters to be tuned that are parameters included in the cost function and a range of the regularization parameters, and
train, in the range where the regularization parameters are specified, the model using the cost function including the specified loss function, the specified regularization parameters, and the specified regularization term.

5. The information processing apparatus according to claim 1, wherein the one or more hardware processors receive input of the parameter of the model trained by second input data that is different from the first input data.

6. The information processing apparatus according to a claim 1, wherein the one or more hardware processors receives input of the parameters defined based on knowledge about a domain.

7. The information processing apparatus according to claim 1, wherein the one or more hardware processors display the change in at least one of a table format and a graph format.

8. The information processing apparatus according to claim 1, wherein the one or more hardware processors receive a specification of a model to be used out of a plurality of models and receive input of a parameter of the specified model.

9. The information processing apparatus according to claim 1, wherein the one or more hardware processors:
receive the parameter for each of the models, and
use the cost function for which a cost is smaller as changes among respective parameters are smaller.

10. An information processing apparatus comprising:
one or more hardware processors configured to:
receive input a parameter of a model to be estimated by machine learning and input of first input data;
train, by using the first input data as training data, the model sparsely by continuously optimizing a change with respect to the model using a cost function; and
control display of at least one of the parameter after the training and the change on a display, wherein
the cost function includes a loss function and a regularization term using the change, and
the regularization term is defined by at least one of an L1 norm, Smoothly Clipped Absolute Derivation (SCAD), Minimax Concave Penalty (MCP), an Lq norm that is 0≤q<1, Elastic Net, an L1/2 norm, and a square of an L1 norm of the change.

11. An information processing method implemented by a computer, the method comprising:
receiving input of parameter of a model to be estimated by machine learning and input of first input data;
training, by using the first input data as training data, the model using a cost function for which a cost is smaller as a change in the parameter is smaller; and
controlling, display of at least one of the parameter after the training and the change on a display, wherein
the cost function includes a loss function and a regularization term using the change, and
the regularization term is defined by at least one of an L1 norm Smoothly Clipped Absolute Derivation (SCAD), Minimax Concave Penalty (MCP), an Lq norm that is 0≤q<1, Elastic Net, an L1/2 norm, and a square of an L1 norm of the change.

12. A computer program product having a computer readable medium including programmed instructions, wherein the instructions, when executed by a computer, cause the computer to perform:
receiving input of a parameter of a model to be estimated by machine learning and input of first input data;
training, by using the first input data as training data, the model using a cost function for which a cost is smaller as a change in the parameter is smaller; and
controlling display of at least one of the parameter after the training and the change on a display, wherein
the cost function includes a loss function and a regularization term using the change, and
the regularization term is defined by at least one of an L1 norm, Smoothly Clipped Absolute Derivation (SCAD), Minimax Concave Penalty (MCP), an Lq norm that is $0 \leq q < 1$, Elastic Net an L1/2 norm, and a square of an L1 norm of the change.

13. An information processing apparatus comprising:
one or more hardware processors configured to:
    receive input of a parameter of a model to be estimated by machine learning and input of first input data; and
    train, by using the first input data as training data, the model using a cost function for which a cost is smaller as a change in the parameter is smaller, wherein
the cost function includes a loss function and a regularization term using the change, and
the one or more hardware processors:
    receive a specification of the loss function, the regularization term, regularization parameters to be tuned that are parameters included in the cost function and a range of the regularization parameters, and
    train, in the range where the regularization parameters are specified, the model using the cost function including the specified loss function, the specified regularization parameters, and the specified regularization term.

* * * * *